(12) United States Patent
Fumoto et al.

(10) Patent No.: US 11,243,031 B2
(45) Date of Patent: Feb. 8, 2022

(54) HEAT EXCHANGER AND METHOD FOR PRODUCING SAME

(71) Applicant: NGK INSULATORS, LTD., Nagoya (JP)

(72) Inventors: Yutaro Fumoto, Kasugai (JP); Tatsuo Kawaguchi, Mizuho (JP); Takeshi Sakuma, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 16/903,585

(22) Filed: Jun. 17, 2020

(65) Prior Publication Data

US 2021/0080185 A1 Mar. 18, 2021

(30) Foreign Application Priority Data

Sep. 12, 2019 (JP) .............................. JP2019-166656

(51) Int. Cl.
*F28D 7/12* (2006.01)
*F28D 7/10* (2006.01)

(52) U.S. Cl.
CPC .............. *F28D 7/12* (2013.01); *F28D 7/103* (2013.01)

(58) Field of Classification Search
CPC ... F28D 7/106; F28D 7/12; F28D 7/10; F28D 7/103
USPC ........................................................ 165/154
See application file for complete search history.

(56) References Cited

U.S. PATENT DOCUMENTS

| 8,905,122 | B2* | 12/2014 | Kim | F28F 1/003 |
| | | | | 165/154 |
| 9,394,813 | B2* | 7/2016 | Geminn | F28D 7/103 |
| 9,459,052 | B2* | 10/2016 | Kinder | F28F 13/12 |
| 10,619,947 | B2* | 4/2020 | Kawaguchi | F28D 7/106 |

(Continued)

FOREIGN PATENT DOCUMENTS

| CN | 102788523 A | 11/2012 |
| DE | 11 2014 006 300 T5 | 11/2016 |

(Continued)

OTHER PUBLICATIONS

German Office Action (Application No. 10 2020 208 062.3) dated Sep. 23, 2021 (with English translation).

(Continued)

*Primary Examiner* — Jon T. Schermerhorn, Jr.
(74) *Attorney, Agent, or Firm* — Burr & Brown, PLLC (57) ABSTRACT

A heat exchanger includes: a pillar shaped honeycomb; an inner cylindrical member; an outer cylindrical member arranged on a radially outer side of the inner cylindrical member such that a part of the outer cylindrical member forms a flow path for a second fluid; an upstream cylindrical member having a cylindrical portion and a flange portion, the upstream cylindrical member being located on a side of a first end face of the honeycomb structure, and an end portion of the flange portion being connected to the inner cylindrical member and/or the outer cylindrical member; and a downstream cylindrical member having a cylindrical portion and a flange portion, the downstream cylindrical member being located on a side of a second end face of the honeycomb structure, and an end portion of the flange portion being connected to the inner cylindrical member and/or the outer cylindrical member.

9 Claims, 2 Drawing Sheets

(56) References Cited

U.S. PATENT DOCUMENTS

| | | | | |
|---|---|---|---|---|
| 2006/0054381 | A1* | 3/2006 | Takemoto | F28D 7/103 |
| | | | | 181/237 |
| 2012/0144814 | A1* | 6/2012 | Won | F02G 5/02 |
| | | | | 60/320 |
| 2012/0222845 | A1* | 9/2012 | Kinder | F28F 13/12 |
| | | | | 165/154 |
| 2013/0133855 | A1* | 5/2013 | Kim | F28F 1/424 |
| | | | | 165/41 |
| 2015/0152762 | A1* | 6/2015 | Geminn | F01N 5/02 |
| | | | | 165/51 |
| 2015/0204623 | A1 | 7/2015 | Neher et al. | |
| 2016/0341489 | A1 | 11/2016 | Ichiyanagi et al. | |
| 2018/0142967 | A1* | 5/2018 | Kawaguchi | F28D 7/1676 |
| 2019/0277570 | A1 | 9/2019 | Kawaguchi et al. | |
| 2019/0301807 | A1* | 10/2019 | Kawaguchi | F28F 9/0219 |

FOREIGN PATENT DOCUMENTS

| | | |
|---|---|---|
| EP | 3 454 001 A1 | 3/2019 |
| EP | 3 561 426 A1 | 10/2019 |
| JP | 2007-077839 A | 3/2007 |
| JP | 2012-037165 A1 | 2/2012 |
| WO | 2019/135312 A1 | 7/2019 |

OTHER PUBLICATIONS

Chinese Office Action, Chinese Application No. 202010510481.6 dated Nov. 24, 2021 (6 pages).

* cited by examiner

HEAT EXCHANGER AND METHOD FOR PRODUCING SAME

FIELD OF THE INVENTION

The present invention relates to a heat exchanger and a method for producing the same.

BACKGROUND OF THE INVENTION

Recently, there is a need for improvement of fuel economy of motor vehicles. In particular, a system is expected that worms up a coolant, engine oil and an automatic transmission fluid (ATF: Automatic Transmission Fluid) at an early stage to reduce friction losses, in order to prevent deterioration of fuel economy at the time when an engine is cold, such as when the engine is started. Further, a system is expected that heats an exhaust gas purifying catalyst in order to activate the catalyst at an early stage.

A such systems, for example, there is a heat exchanger. The heat exchanger is a device that exchanges heat between a first fluid and a second fluid by allowing the first fluid to flow inside and the second fluid to flow outside. In such a heat exchanger, for example, the heat can be effectively utilized by exchanging the heat from the first fluid having a higher temperature (for example, an exhaust gas) to the second fluid having a lower temperature (for example, cooling water).

In Patent Literature 1, the applicant of the present application proposes a heat exchanger including: a pillar shaped honeycomb structure having partition walls that define a plurality of cells extending from a first end face to a second end face to form flow paths for a first fluid, and an outer peripheral wall; an inner cylindrical member fitted to the outer peripheral wall of the honeycomb structure; and an outer cylindrical member arranged on a radially outer side of the inner cylindrical member with a distance such that at least a part of the outer cylindrical member forms a flow path for a second fluid. In the heat exchanger having such a structure, a pressure loss can be reduced by increasing a cross-sectional area of the pillar shaped honeycomb structure in a direction perpendicular to an axial direction. On the other hand, since this heat exchanger is connected to an exhaust pipe through which the first fluid flows, it is required to provide a connecting portion corresponding to a size of the exhaust pipe.

CITATION LIST

Patent Literatures

[Patent Literature 1] Japanese Patent Application Publication No. 2012-037165 A

SUMMARY OF THE INVENTION

The present invention relates to a heat exchanger, comprising:
a pillar shaped honeycomb structure comprising: partition walls defining a plurality of cells, each of the cells extending from a first end face to a second end face to form a flow path for a first fluid; and an outer peripheral wall;
an inner cylindrical member fitted to the outer peripheral wall of the honeycomb structure;
an outer cylindrical member arranged on a radially outer side of the inner cylindrical member such that a part of the outer cylindrical member forms a flow path for a second fluid;
an upstream cylindrical member having a cylindrical portion and a flange portion, the upstream cylindrical member being located on a side of the first end face of the honeycomb structure, and an end portion of the flange portion being connected to the inner cylindrical member and/or the outer cylindrical member; and
a downstream cylindrical member having a cylindrical portion and a flange portion, the downstream cylindrical member being located on a side of the second end face of the honeycomb structure, and an end portion of the flange portion being connected to the inner cylindrical member and/or the outer cylindrical member,
wherein both axial end portions of the flow path for the second fluid are located on axially outer sides than the first end face and the second end face of the honeycomb structure, respectively, and
wherein at least one of the upstream cylindrical member and the downstream cylindrical member has a rising position of the flange portion, the rising position being located on an axially inner side than the both axial end portions of the flow path for the second fluid.

Also, the present invention relates to a method for producing a heat exchanger, the method comprising the steps of:
preparing a heat exchange member comprising: a pillar shaped honeycomb structure comprising partition walls defining a plurality of cells, each of the cells extending from a first end face to a second end face to form a flow path for a first fluid, and an outer peripheral wall; and an inner cylindrical member fitted to the outer peripheral wall of the honeycomb structure;
arranging an outer cylindrical member on a radially outer side of the inner cylindrical member with a distance such that at least a part of the outer cylindrical member forms a flow path for a second fluid;
arranging an upstream cylindrical member having a cylindrical portion and a flange portion on a side of the first end face of the honeycomb structure and connecting an end portion of the flange portion to the inner cylindrical member and/or the outer cylindrical member; and
arranging a downstream cylindrical member having a cylindrical portion and a flange portion on a side of the second end face of the honeycomb structure and connecting an end portion of the flange portion to the inner cylindrical member and/or the outer cylindrical member,
wherein both axial end portions of the flow path for the second fluid are located on axially outer sides than the first end face and the second end face of the honeycomb structure, respectively, and
wherein at least one of the upstream cylindrical member and the downstream cylindrical member has a rising position of the flange portion, the rising position being located on an axially inner side than the both axial end portions of the flow path for the second fluid.

DETAILED DESCRIPTION OF THE INVENTION

In order to provide the connecting portion corresponding to the size of the exhaust pipe, the present inventors have studied a heat exchanger further including a cylindrical member called a cone as a connecting portion to the exhaust pipe. The cone for use in the heat exchanger has a cylinder portion connected to the exhaust pipe and a flange portion connected to the outer cylindrical member. By providing the cones having such a structure on the first end face side and the second end face side of the honeycomb structure, the connecting portion corresponding to the size of the exhaust pipe can be provided.

However, recently, there is an increasing need for a heat exchanger having a compact structure, and there is a problem that when the above cones are provided in the heat exchanger, an axial length of the heat exchanger increases, and it is difficult to provide a compact heat exchanger.

The present invention has been made to solve the above problems. An object of the present invention is to provide a heat exchanger having a compact structure and a method for producing the same.

As results of intensive studies of a structure of a heat exchanger, the present inventors have found that a heat exchanger having a specific structure can solve the above problems, and have completed the present invention.

According to the present invention, it is possible to provide a heat exchanger having a compact structure and a method for producing the same.

Hereinafter, embodiments of the present invention will be specifically described with reference to the drawings. It is to understand that the present invention is not limited to the following embodiments, and those which appropriately added changes, improvements and the like to the following embodiments based on knowledge of a person skilled in the art without departing from the spirit of the present invention fall within the scope of the present invention.

Figure 1:
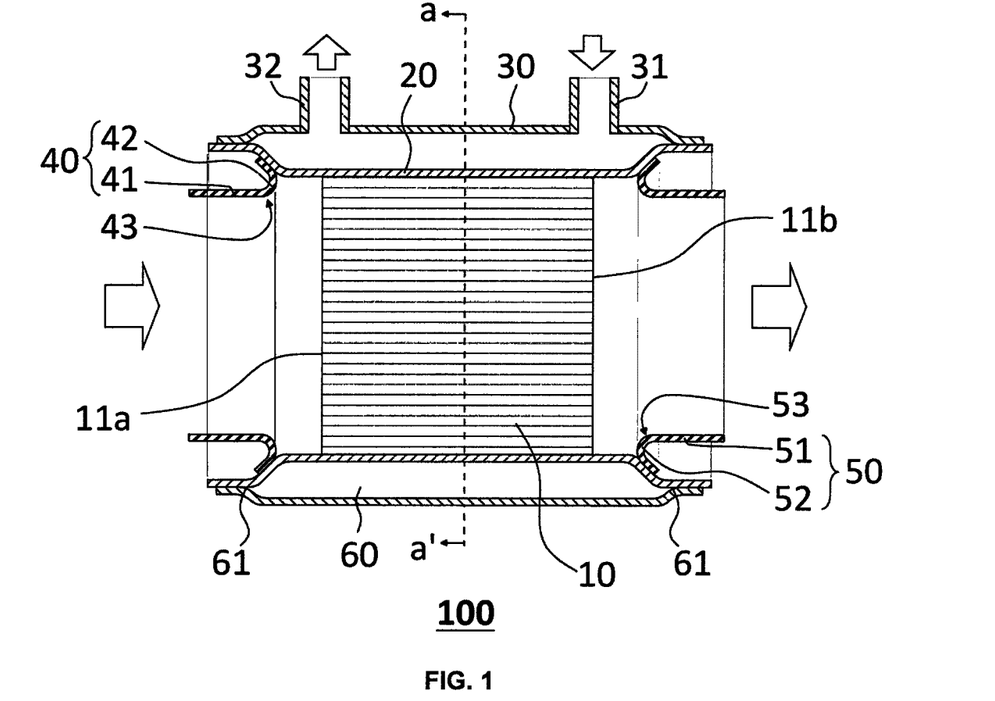
FIG. 1 is a cross-sectional view of a heat exchanger according to an embodiment of the present invention, which is parallel to a flow direction of a first fluid.
Figure 2:
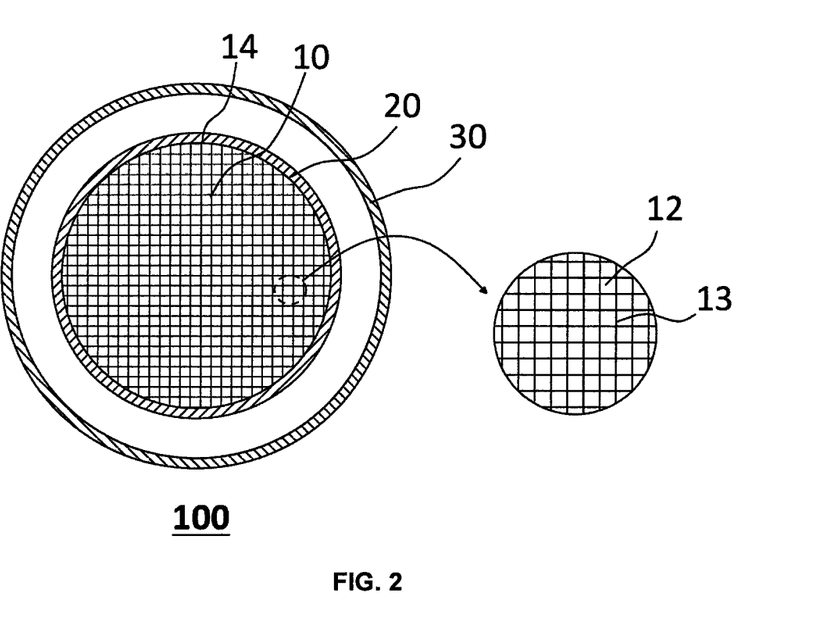
FIG. 2 is a cross-sectional view taken along the line a-a' in the heat exchanger of FIG. 1.

FIG. 1 is a cross-sectional view of a heat exchanger according to an embodiment of the present invention, which is parallel to a flow direction of a first fluid. FIG. 2 is a cross-sectional view taken along the line a-a' in the heat exchanger of FIG. 1.

As shown in FIGS. 1 and 2, a heat exchanger 100 according to an embodiment of the present invention includes: a pillar shaped honeycomb structure 10; an inner cylindrical member 20; an outer cylindrical member 30; and an upstream cylindrical member 40; and a downstream cylindrical member 50.

<Pillar Shaped Honeycomb Structure 10>

The pillar shaped honeycomb structure 10 includes: partition walls 13 which define a plurality of cells 12 extending from a first end face 11a to a second end face 11b to form flow paths for a first fluid; and an outer peripheral wall 14.

A shape (outer shape) of the pillar shaped honeycomb structure 10 is not particularly limited, and it may be, for example, a circular pillar shape, an elliptical pillar shape, a quadrangular pillar shape, or other polygonal pillar shape.

A diameter (an outer diameter) of the pillar shaped honeycomb structure 10 in the cross section perpendicular to the flow path direction of the first fluid may preferably be from 20 to 200 mm, and more preferably from 30 to 100 mm, although not particularly limited thereto. Such an outer diameter can allow improvement of heat recovery efficiency while reducing pressure loss. When the cross-sectional shape is not circular, the diameter of the largest inscribed circle that is inscribed in the cross section is defined as the diameter of the pillar shaped honeycomb structure 10.

A length (axial length) of the pillar shaped honeycomb structure 10 in the direction parallel to the flow path direction of the first fluid may be preferably ten times or less, more preferably four times or less the outer diameter (diameter) of the pillar shaped honeycomb structure 10. Such an axial length can provide a compact heat exchanger.

Each cell 12 may have any shape, including, but not particularly limited to, circular, elliptical, triangular, quadrangular, hexagonal and other polygonal shapes in the cross section in the direction perpendicular to the flow path direction of the first fluid. Also, the cells 12 are radially provided in the cross section in the direction perpendicular to the flow path direction of the first fluid. Such a structure can allow heat of the first fluid flowing through the cells 12 to be efficiently transmitted to the outside of the pillar shaped honeycomb structure 10.

A thickness of each partition wall 13 is not particularly limited, and it may preferably be from 0.1 to 1 mm, and more preferably from 0.2 to 0.6 mm. The thickness of the partition wall 13 of 0.1 mm or more can provide the pillar shaped honeycomb structure 10 with a sufficient mechanical strength. Further, the thickness of the partition wall 5 of 1.0 mm or less can prevent problems that the pressure loss is increased due to a decrease in an opening area and the heat recovery efficiency is decreased due to a decrease in a contact area with the first fluid.

The outer peripheral wall 14 preferably has a thickness larger than that of the partition wall 13, although not particularly limited thereto. Such a structure can lead to increased strength of the outer peripheral wall 14 which would otherwise tend to generate breakage (e.g., cracking, chinking, and the like) by external impact, thermal stress due to a temperature difference between the first fluid and the second fluid, and the like.

In addition, the thickness of the outer peripheral wall 14 is not particularly limited, and it may be adjusted as needed according to applications and the like. For example, the thickness of the outer peripheral wall 14 is preferably 0.3 mm or more and 10 mm or less, and more preferably from 0.5 mm to 5 mm, and even more preferably from 1 mm to 3 mm, when using the heat exchange 100 for general heat exchange applications. Moreover, when using the heat exchanger 100 for heat storage applications, the thickness of the outer peripheral wall 14 is preferably 10 mm or more, in order to increase a heat capacity of the outer peripheral wall 14.

The partition walls 13 and the outer peripheral wall 14 preferably contain ceramics as a main component. The phrase "contain ceramics as a main component" means that a ratio of a mass of ceramics to the masses of the total components is 50% by mass or more.

The partition walls 13 and the outer peripheral wall 14 preferably contain SiC (silicon carbide) having high thermal conductivity as a main component. Examples of such a material includes Si-impregnated SiC, (Si+Al)-impregnated SiC, a metal composite SiC, recrystallized SiC, $Si_3N_4$, SiC, and the like. Among them, Si-impregnated SiC and (Si+Al)-impregnated SiC are preferably used because they can allow production at lower cost and have high thermal conductivity.

Each of the partition walls 13 and the outer peripheral wall 14 preferably has a porosity of 10% or less, and more preferably 5% or less, and even more preferably 3% or less, although not particularly limited thereto. Further, the porosity of the partition walls 13 and the outer peripheral wall 14 may be 0%. The porosity of the partition walls 13 and the outer peripheral wall 14 of 10% or less can lead to improvement of thermal conductivity.

A cell density (that is, the number of cells 12 per unit area) in the cross section of the pillar shaped honeycomb structure 10 perpendicular to the flow path direction of the first fluid is preferably in a range of from 4 to 320 cells/cm$^2$, although not particularly limited thereto. The cell density of 4 cells/cm$^2$ or more can sufficiently ensure the strength of the partition walls 13, and hence the strength of the pillar shaped honeycomb structure 10 itself and effective GSA (geometrical surface area). Further, the cell density of 320 cells/cm$^2$ or less can allow prevention of an increase in a pressure loss when the first fluid flows.

The pillar shaped honeycomb structure 10 preferably has an isostatic strength of more than 100 MPa, and more preferably 150 MPa or more, and still more preferably 200 MPa or more, although not particularly limited thereto. The isostatic strength of the pillar shaped honeycomb structure 10 of 100 MPa or more can result in the pillar shaped honeycomb structure 10 having improved durability. The isostatic strength of the pillar shaped honeycomb structure 10 can be measured according to the method for measuring isostatic fracture strength as defined in the JASO standard M505-87 which is a motor vehicle standard issued by Society of Automotive Engineers of Japan, Inc.

The pillar shaped honeycomb structure 10 preferably has a thermal conductivity of 50 W/(m·K) or more at 25° C., and more preferably from 100 to 300 W/(m·K), and even more preferably from 120 to 300 W/(m K), although not particularly limited thereto. The thermal conductivity of the pillar shaped honeycomb structure 10 in such a range can lead to an improved thermal conductivity and can allow the heat inside the pillar shaped honeycomb structure 10 to be efficiently transmitted to the outside. It should be noted that the value of thermal conductivity is a value measured according to the laser flash method (JIS R 1611-1997).

In the case where an exhaust gas as the first fluid flows through the cells 12 of the pillar shaped honeycomb structure 10, a catalyst may be supported on the partition walls 13 of the pillar shaped honeycomb structure 10. The supporting of the catalyst on the partition walls 13 can allow CO, NOx, HC and the like in the exhaust gas to be converted into harmless substances through catalytic reaction, and can also allow reaction heat generated during the catalytic reaction to be utilized for heat exchange. Preferable catalysts include those containing at least one element selected from the group consisting of noble metals (platinum, rhodium, palladium, ruthenium, indium, silver and gold), aluminum, nickel, zirconium, titanium, cerium, cobalt, manganese, zinc, copper, tin, iron, niobium, magnesium, lanthanum, samarium, bismuth, and barium. Any of the above-listed elements may be contained as a metal simple substance, a metal oxide, or other metal compound.

A supported amount of the catalyst (catalyst metal+support) may preferably be from 10 to 400 g/L, although not particularly limited thereto. Further, when using the catalyst containing the noble metal(s), the supported amount may preferably be from 0.1 to 5 g/L, although not particularly limited thereto. The supported amount of the catalyst (catalyst metal+support) of 10 g/L or more can easily achieve catalysis. Also, the supported amount of the catalyst (catalyst metal+support) of 400 g/L or less can allow suppression of both an increase in a pressure loss and an increase in a manufacturing cost. The support refers to a carrier on which a catalyst metal is supported. Examples of the supports include those containing at least one selected from the group consisting of alumina, ceria and zirconia.

<Inner Cylindrical Member 20>

The inner cylindrical member 20 is fitted to the outer peripheral wall 14 of the pillar shaped honeycomb structure 10.

It is preferable that an axial direction of the inner cylindrical member 20 coincides with that of the pillar shaped honeycomb structure 10, and a central axis of the inner cylindrical member 20 coincides with that of the pillar shaped honeycomb structure 10. It is also preferable that an axial center position of the inner cylindrical member 20 coincides with that of the pillar shaped honeycomb structure 10. Further, diameters (an outer diameter and an inner diameter) of the inner cylindrical member 20 may be uniform in the axial direction, but the diameter of at least a part (for example, both axial end portions) of the first outer cylinder may be increased or decreased.

The inner cylindrical member 20 is not particularly limited as long as it is fitted to the outer peripheral wall 14 of the pillar shaped honeycomb structure 10. Examples of the inner cylindrical member 20 that can be used include a cylindrical member fitted to the outer peripheral wall 14 of the pillar shaped honeycomb structure 10 to cover circumferentially the outer peripheral wall 14 of the pillar shaped honeycomb structure 10.

As used herein, the "fitted" means that the pillar shaped honeycomb structure 10 and the inner cylindrical member 20 are fixed in a state of being suited to each other. Therefore, the fitting of the pillar shaped honeycomb structure 10 and the inner cylindrical member 20 encompasses cases where the pillar shaped honeycomb structure 10 and the inner cylindrical member 20 are fixed to each other by a fixing method based on fitting such as clearance fitting, interference fitting and shrinkage fitting, as well as by brazing, welding, diffusion bonding, or the like.

The inner cylindrical member 20 may preferably have an inner peripheral surface shape corresponding to the outer peripheral wall 14 of the pillar shaped honeycomb structure 10. Since the inner peripheral surface of the inner cylindrical member 20 is in direct contact with the outer peripheral wall 14 of the pillar shaped honeycomb structure 10, the thermal conductivity is improved and the heat in the pillar shaped honeycomb structure 10 can be efficiently transferred to the inner cylindrical member 20.

In terms of improvement of the heat recovery efficiency, a higher ratio of an area of a portion circumferentially covered with the inner cylindrical member 20 in the outer peripheral wall 14 of the pillar shaped honeycomb structure 10 to the total area of the outer peripheral wall 14 of the pillar shaped honeycomb structure 10 is preferable. Specifically, the area ratio is preferably 80% or more, and more preferably 90% or more, and even more preferably 100% (that is, the entire outer peripheral wall 14 of the pillar shaped honeycomb structure 10 is circumferentially covered with the inner cylindrical member 20).

It should be noted that the term "outer peripheral wall 14" as used herein refers to a surface of the pillar shaped honeycomb structure 10, which is parallel to the flow path direction of the first fluid, and does not include surfaces (the first end face 11a and the second end face 11b) of the pillar shaped honeycomb structure 10, which are perpendicular to the flow path direction of the first fluid.

The inner cylindrical member 20 is preferably made of a metal in terms of manufacturability, although not particularly limited thereto. Further, the metallic inner cylindrical member 20 is also preferable in that it can be easily welded to an outer cylindrical member 30 or the like, which will be described below. Examples of the material of the inner cylindrical member 20 that can be used include stainless steel, titanium alloys, copper alloys, aluminum alloys, brass and the like. Among them, the stainless steel is preferable because it has high durability and reliability and is inexpensive.

The inner cylindrical member 20 preferably has a thickness of 0.1 mm or more, and more preferably 0.3 mm or more, and still more preferably 0.5 mm or more, although not particularly limited thereto. The thickness of the inner cylindrical member 20 of 0.1 mm or more can ensure durability and reliability. The thickness of the inner cylindrical member 20 is preferably 10 mm or less, and more preferably 5 mm or less, and still more preferably 3 mm or less. The thickness of the inner cylindrical member 20 of 10 mm or less can reduce thermal resistance and improve thermal conductivity.

<Outer Cylindrical Member 30>

The outer cylindrical member 30 is arranged on a radially outer side of the inner cylindrical member 20 with a distance such that at least a part of the outer cylindrical member 30 forms a flow path 60 for a second fluid.

It is preferable that an axial direction of the outer cylindrical member 30 coincides with that of each of the pillar shaped honeycomb structure 10 and the inner cylindrical member 20, and a central axis of the outer cylindrical member 30 coincides with that of each of the pillar shaped honeycomb structure 10 and the inner cylindrical member 20. Further, it is also preferable that an axial center position of the outer cylindrical member 30 coincides with that of each of the pillar shaped honeycomb structure 10 and the inner cylindrical member 20.

The outer cylindrical member 30 is preferably connected to both a feed pipe 31 for feeding the second fluid to a region between the outer cylindrical member 30 and the inner cylindrical member 20, and a discharge pipe 32 for discharging the second fluid from the region between the outer cylindrical member 30 and the inner cylindrical member 20. The feed pipe 31 and the discharge pipe 32 are preferably provided at positions corresponding to both axial end portions of the pillar shaped honeycomb structure 10, respectively.

The feed pipe 31 and the discharge pipe 32 may extend in the same direction, or may extend in different directions.

The outer cylindrical member 30 is preferably arranged such that inner peripheral surfaces of the both axial end portions are in direct or indirect contact with the outer peripheral surface of the inner cylindrical member 20.

A method of fixing the inner peripheral surfaces of the both axial end portions to the outer peripheral surface of the inner cylindrical member 20 that can be used includes, but not limited to, fitting such as clearance fitting, interference fitting and shrinkage fitting, as well as brazing, welding, diffusion bonding, and the like.

Diameters (outer diameter and inner diameter) of the outer cylindrical member 30 may be uniform in the axial direction, but the diameter of at least a part (for example, an axial center portion, both axial end portions, or the like) of the outer cylindrical member 30 may be decreased or increased. For example, by decreasing the diameter of the axial center portion of the outer cylindrical member 30, the second fluid can spread throughout the outer peripheral direction of the inner cylindrical member 20 in the outer cylindrical member 30 on the feed pipe 31 and discharge pipe 32 sides. Therefore, an amount of the second fluid that does not contribute to the heat exchange at the axial center portion is reduced, so that the heat exchange efficiency can be improved.

A material of the outer cylindrical member 30 is not particularly limited, and may be the same as that of the inner cylindrical member 20 as described above.

A thickness of the outer cylindrical member 30 is not particularly limited and may be the same as that of the inner cylindrical member 20 as described above.

Axial end portions 61 of a flow path 60 for the second fluid, which is formed between the outer cylindrical member 30 and the inner cylindrical member 20, are located on more axially outer sides than the first end face 11a and the second end face 11b of the pillar shaped honeycomb structure 10, respectively. Such a structure can improve a heat exchange efficiency.

<Upstream Cylindrical Member 40 and Downstream Cylindrical Member 50>

The upstream cylindrical member 40 and the downstream cylindrical member 50 are cylindrical members also called cones.

The upstream cylindrical member 40 has a cylindrical portion 41 and a flange portion 42. Similarly, the downstream cylindrical member 50 has a cylindrical portion 51 and a flange portion 52.

The upstream cylindrical member 40 is located on the first end face 11a side of the pillar shaped honeycomb structure 10, and an end portion of the flange portion 42 is connected to the inner cylindrical member 20. The downstream cylindrical member 50 is located on the second end face 11b side of the pillar shaped honeycomb structure 10, and an end portion of the flange portion 52 is connected to the inner cylindrical member 20.

Although FIG. 1 shows an example in which the end portions of the flange portions 42, 52 are connected to the inner cylindrical member 20, the end portions of the flange portions 42, 52 may be connected to the outer cylindrical member 30 or both the inner cylindrical member 20 and the outer cylindrical member 30.

In at least one (preferably both) of the upstream cylindrical member 40 and the downstream cylindrical member 50, rising positions 43, 53 of the flange portions 42, 52 are located on more axially inner sides than the both axial end portions 61 of the flow path 60 for the second fluid, respectively. Such a structure can allow the axial length of at least one (preferably both) of the upstream cylindrical member 40 and the downstream cylindrical member 50 to be shortened, so that the heat exchanger 100 can be made compact. Further, when the first fluid is an exhaust gas, the above structure of the upstream cylindrical member 40 can suppress a risk where the exhaust gas at elevated temperature is brought into contact with the upstream axial end portion of the flow path 60 for the second fluid to generate a heat spot. This can lead to a suppressed heat damage.

It is preferable that an axial direction of each of the upstream cylindrical member 40 and the downstream cylindrical member 50 coincides with that of each of the pillar shaped honeycomb structure 10, the inner cylindrical member 20, and the outer cylindrical member 30, and a central axis of each of the upstream cylindrical member 40 and the downstream cylindrical member 50 coincides with that of each of the pillar shaped honeycomb structure 10, the inner cylindrical member 20, and the outer cylindrical member 30.

The flange portions 42, 52 may have non-limiting various structures. For example, each of the flange portions 42, 52 may have a folded structure. The number of folded portions of the folded structure is not particularly limited, and it may be one or more folded portions. Further, each of the flange portions 42, 52 may have a curved surface structure. Furthermore, each of the flange portions 42, 52 may have a structure bent in a direction perpendicular to the axial direction of each of the cylindrical portions 41, 51.

The surfaces of the flange portions 42, 52 which are contiguous to the inner peripheral surfaces of the cylindrical portions 41, 51 are preferably connected to the inner cylindrical member 20 and/or the outer cylindrical member 30. Such a structure can provide simplified structures of the flange portions 42, 52.

Figure 3:
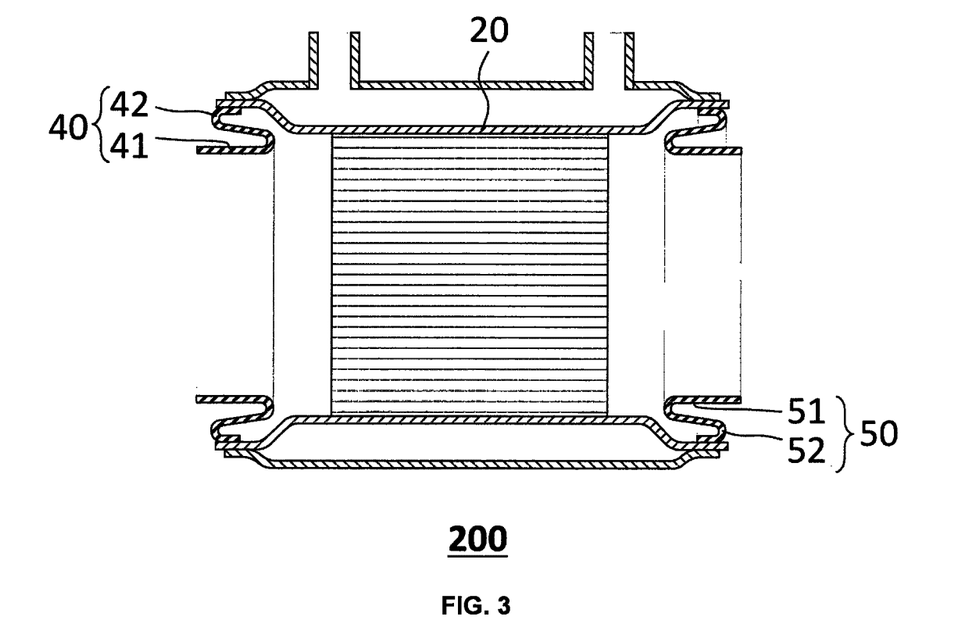
FIG. 3 is a cross-sectional view of another heat exchanger according to an embodiment of the present invention, which is parallel to a flow direction of a first fluid.
Figure 4:
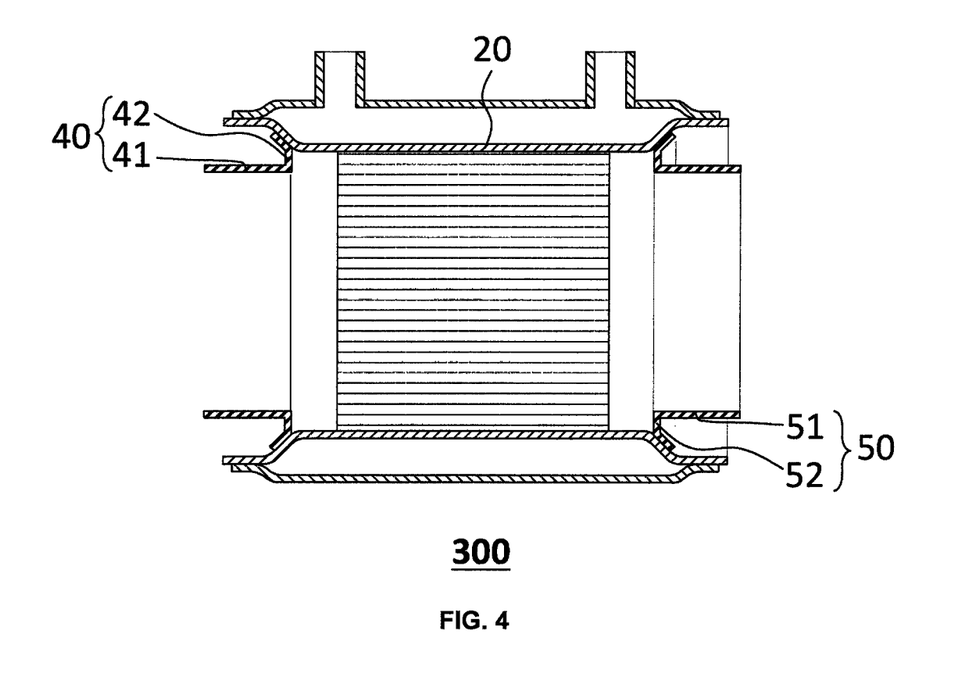
FIG. 4 is a cross-sectional view of other heat exchanger according to an embodiment of the present invention, which is parallel to a flow direction of a first fluid.

Here, examples of heat exchangers including the upstream cylindrical member 40 and the downstream cylindrical member 50 having the flange portions 42, 52 having various structures are shown in FIGS. 3 and 4. In addition, FIGS. 3 and 4 are cross-sectional views of heat exchangers, which are parallel to the flow direction of the first fluid.

A heat exchanger 200 as shown in FIG. 3 includes the upstream cylindrical member 40 and the downstream cylindrical member 50 in which each of the flange portions 42, 52 has a folded structure with two folded portions and a curved surface structure. In the heat exchanger 200, the surfaces of the flange portions 42, 52, which are contiguous to the outer peripheral surfaces of the cylindrical portions 41, 51, are connected to the inner cylindrical member 20.

A heat exchanger 300 as shown in FIG. 4 has the upstream cylindrical member 40 and the downstream cylindrical member 50 in which each of the flange portions 42, 52 has a folded structure having one folded portion and a structure in which each of the flange portions 42, 52 is bent in a direction perpendicular to the axial direction of each of the cylindrical portions 41, 51. In the heat exchanger 300, the surfaces of the flange portions 42, 52, which are contiguous to the inner peripheral surfaces of the cylindrical portions 41, 51, are connected to the inner cylindrical member 20.

Although each of FIGS. 3 and 4 shows an example in which the structure of the flange portion 42 and the structure of the flange portion 52 are the same as each other, the structure of the flange portion 42 and the structure of the flange portion 52 may be different from each other.

The upstream cylindrical member 40 may be formed by connecting the cylindrical portion 41 and the flange portion 42 by means of welding or the like. However, it is preferable that the cylindrical portion 41 and the flange portion 42 are integrally formed by machining one cylindrical member. It should be noted that the term "integrally" means that the cylindrical portion 41 and the flange portion 42 are seamlessly provided by processing one cylindrical member as described above, rather than by connecting separate members by welding, adhesion, or the like. Similarly, the downstream cylindrical member 50 may be formed by connecting the cylindrical portion 51 and the flange portion 52 by means of welding or the like, but it is preferable that the cylindrical portion 51 and the flange portion 52 is integrally formed by machining one cylindrical member.

It is preferable that cross-sectional areas of the cylindrical portions 41, 51 of the upstream cylindrical member 40 and the downstream cylindrical member 50, which are perpendicular to the axial direction, are lower than the cross-sectional area of the pillar shaped honeycomb structure 10, which is perpendicular to the axial direction. Such a structure can allow the cylindrical portions 41, 51 of the upstream cylindrical member 40 and the downstream cylindrical member 50 to be adapted to the size of the exhaust pipe while reducing the pressure loss of the heat exchangers 100, 200, 300.

A material of each of the upstream cylindrical member 40 and the downstream cylindrical member 50 is not particularly limited, and may be the same as that of the inner cylindrical member 20 as described above.

Each thickness of the upstream cylindrical member 40 and the downstream cylindrical member 50 is not particularly limited, and may be the same as that of the inner cylindrical member 20 as described above.

<Other Members>

Each of the heat exchangers 100, 200, 300 may further include various members in order to achieve a desired purpose within a scope that does not impair the effects of the present invention.

For example, in order to reduce abnormal noises during suppression of heat exchange, an intermediate cylindrical member may be provided between the inner cylindrical member 20 and the outer cylindrical member 30 in order to partition the interior of the flow path 60 for the second fluid. The intermediate cylindrical member may be held by spacers provided at both axial end portions of the inner cylindrical member 20, although not particular limited thereto.

<First Fluid and Second Fluid>

The first fluid and the second fluid are not particularly limited, and various liquids and gases can be used. For example, when each of the heat exchangers 100, 200, 300 is mounted on a motor vehicle, an exhaust gas can be used as the first fluid, and water or antifreeze (LLC defined by JIS K2234: 2006) can be used as the second fluid. Further, the first fluid can be a fluid having a temperature higher than that of the second fluid.

<Method for Producing Heat Exchangers 100, 200, 300>

The heat exchangers 100, 200, 300 can be produced according to a method known in the art. For example, a typical method for producing the heat exchangers 100, 200, 300 includes: a step (a first step) of preparing a heat exchange member including: a pillar shaped honeycomb structure 10 having partition walls 13 defining a plurality of cells 12, each of the cells 12 extending from a first end face 11a to a second end face 11b to form a flow path for a first fluid, and an outer peripheral wall 14; and an inner cylindrical member 20 fitted to the outer peripheral wall 14 of the honeycomb structure 10; a step (a second step) of arranging an outer cylindrical member 30 on a radially outer side of the inner cylindrical member 20 with a distance such that at least a part of the outer cylindrical member 30 forms a flow path 60 for a second fluid; a step (a third step) of arranging an upstream cylindrical member 40 having a cylindrical portion 41 and a flange portion 42 on a side of the first end face 11a of the pillar shaped honeycomb structure 10 and connecting an end portion of the flange portion 42 to the inner cylindrical member 20 and/or the outer cylindrical member 30; and a step (a fourth step) of arranging a downstream cylindrical member 50 having a cylindrical portion 51 and a flange portion 52 on a side of the second end face 11b of the pillar shaped honeycomb structure 10 and connecting an end portion of the flange portion 52 to the inner cylindrical member 20 and/or the outer cylindrical member 30.

It is to understand that the order of the first to fourth steps is not particularly limited, and the order of the steps may be changed depending on the shape of each of the heat exchangers 100, 200, 300 to be produced. Further, the feed pipe 31 and the discharge pipe 32 may be previously provided at the outer cylindrical member 30, but they may be provided at the outer cylindrical member 30 at an appropriate stage. The method described above may be used as the method of arranging (fixing) each member.

In the producing method, the both axial end portions 61 of the flow path 60 for the second fluid are provided so as to be positioned on axially outer sides than the first end face 11a and the second end face 11b of the pillar shaped honeycomb structure 10, respectively. Further, in at least one of the upstream cylindrical member 40 and the downstream cylindrical member 50, the rising positions 43, 53 of the flange portions 42, 52 are provided so as to be positioned on axially inner sides than the both axial end portions 61 of the flow path 60 for the second fluid, respectively.

The pillar shaped honeycomb structure 10 can be produced as follows:

First, a green body containing ceramic powder is extruded into a desired shape to prepare a pillar shaped honeycomb formed body. At this time, the shape and density of the cells 12, and lengths and thicknesses of the partition walls 13 and the outer peripheral wall 14, and the like, can be controlled by selecting dies and jigs in appropriate forms. The material of the pillar shaped honeycomb formed body that can be used includes the ceramics as described above. For example, when producing a pillar shaped honeycomb formed body containing the Si-impregnated SiC composite as a main component, a binder and water and/or an organic solvent are added to a predetermined amount of SiC powder, and the resulting mixture is kneaded to form a green body, which can be then formed into a pillar shaped honeycomb formed body. The resulting pillar shaped honeycomb formed body can be then dried, and the pillar shaped honeycomb formed body can be impregnated with metallic Si and fired under a reduced pressure in an inert gas or vacuum to obtain a pillar shaped honeycomb structure 10.

Since each of the heat exchangers 100, 200, 300 produced as described above uses the upstream cylindrical member 40 and the downstream cylindrical member 50 each having a specific structure, the axial length can be shortened, thereby making it compact.

DESCRIPTION OF REFERENCE NUMERALS

10 pillar shaped honeycomb structure
11a first end face
11b second end face
12 cell
13 partition wall
14 outer peripheral wall
20 inner cylindrical member
30 outer cylindrical members
31 feed pipe
32 discharge pipe
40 upstream cylindrical member
41 cylindrical portion
42 flange portion
43 rising position
50 downstream cylindrical member
51 cylindrical portion
52 flange portion
53 rising position
60 flow path for second fluid
61 both axial end portions
100,200,300 heat exchanger

The invention claimed is:

1. A heat exchanger, comprising:
   a pillar shaped honeycomb structure comprising: partition walls defining a plurality of cells, each of the cells extending from a first end face to a second end face to form a flow path for a first fluid; and an outer peripheral wall;
   an inner cylindrical member fitted to the outer peripheral wall of the honeycomb structure;
   an outer cylindrical member arranged on a radially outer side of the inner cylindrical member such that a part of the outer cylindrical member forms a flow path for a second fluid;
   an upstream cylindrical member having a cylindrical portion and a flange portion, the upstream cylindrical member being located on a side of the first end face of the honeycomb structure, and an end portion of the flange portion being connected to the inner cylindrical member and/or the outer cylindrical member; and
   a downstream cylindrical member having a cylindrical portion and a flange portion, the downstream cylindrical member being located on a side of the second end face of the honeycomb structure, and an end portion of the flange portion being connected to the inner cylindrical member and/or the outer cylindrical member,
   wherein both axial end portions of the flow path for the second fluid are located on axially outer sides than the first end face and the second end face of the honeycomb structure, respectively, and
   wherein at least one of the upstream cylindrical member and the downstream cylindrical member has a rising position of the flange portion, the rising position being located on an axially inner side than the both axial end portions of the flow path for the second fluid.

2. The heat exchanger according to claim 1, wherein the flange portion has a folded structure.

3. The heat exchanger according to claim 1, wherein the flange portion has a curved surface structure.

4. The heat exchanger according to claim 1, wherein the flange portion has a structure bent in a direction perpendicular to an axial direction of the cylindrical portion.

5. The heat exchanger according to claim 1, wherein the rising position of the flange portion of the upstream cylindrical member is located on an axially inner side than the both axial end portions of the flow path for the second fluid.

6. The heat exchanger according to claim 1, wherein the cylindrical portion and the flange portion are integrally formed in each of the upstream cylindrical member and the downstream cylindrical member.

7. The heat exchanger according to claim 1, wherein a surface of the flange portion, which is contiguous to an inner peripheral surface of the cylindrical portion, is connected to the inner cylindrical member and/or the outer cylindrical member.

8. The heat exchanger according to claim 1, wherein cross-sectional areas of the cylindrical portions of the upstream cylindrical member and the downstream cylindrical member, which are perpendicular to an axial direction, are lower than a cross-sectional area of the honeycomb structure, which is perpendicular to the axial direction.

9. A method for producing a heat exchanger, the method comprising the steps of:
   preparing a heat exchange member comprising: a pillar shaped honeycomb structure comprising partition walls defining a plurality of cells, each of the cells extending from a first end face to a second end face to form a flow path for a first fluid, and an outer peripheral wall; and an inner cylindrical member fitted to the outer peripheral wall of the honeycomb structure;
   arranging an outer cylindrical member on a radially outer side of the inner cylindrical member with a distance such that at least a part of the outer cylindrical member forms a flow path for a second fluid;

arranging an upstream cylindrical member having a cylindrical portion and a flange portion on a side of the first end face of the honeycomb structure and connecting an end portion of the flange portion to the inner cylindrical member and/or the outer cylindrical member; and arranging a downstream cylindrical member having a cylindrical portion and a flange portion on a side of the second end face of the honeycomb structure and connecting an end portion of the flange portion to the inner cylindrical member and/or the outer cylindrical member, wherein both axial end portions of the flow path for the second fluid are located on axially outer sides than the first end face and the second end face of the honeycomb structure, respectively, and wherein at least one of the upstream cylindrical member and the downstream cylindrical member has a rising position of the flange portion, the rising position being located on an axially inner side than the both axial end portions of the flow path for the second fluid.

* * * * *